No. 873,367. PATENTED DEC. 10, 1907.
O. M. GOULD.
BRAKE.
APPLICATION FILED JAN. 19, 1905.
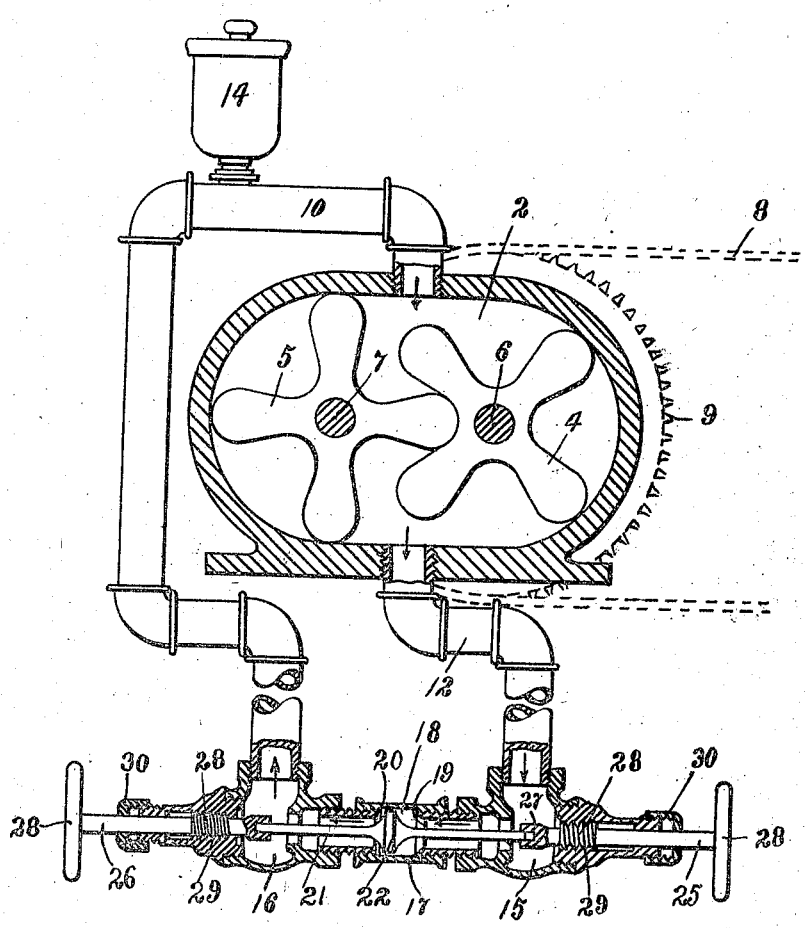

UNITED STATES PATENT OFFICE.

OVID MINER GOULD, OF MONTREAL, QUEBEC, CANADA.

BRAKE.

No. 873,367.  Specification of Letters Patent.  Patented Dec. 10, 1907.

Original application filed February 5, 1904, Serial No. 192,157. Divided and this application filed January 19, 1905.
Serial No. 241,870.

*To all whom it may concern:*

Be it known that I, OVID MINER GOULD, of the city of Montreal, Province of Quebec, Canada, have invented certain new and useful Improvements in Brakes; and I do hereby declare that the following is a full, clear, and exact description of the same.

My invention relates particularly to brakes for controlling the speed of package carriers, and retards the speed as the carrier moves in one direction and allowing it greater freedom as it moves in the opposite direction.

For full comprehension, however, of my invention reference must be had to the accompanying drawing in which my improved brake is illustrated in elevation partly in section.

My improved controller consists of a rotary brake which in itself constitutes no part of this invention but has a novel and essential controlling device in connection therewith. The brake consists of a chamber 2, suitably mounted and containing a pair of intermeshing gears or piston-wheels 4 and 5 mounted rigidly upon a pair of shafts 6 and 7 extending transversely through the casing, while a sprocket chain 8 connects a sprocket wheel 9 mounted on shaft 6 to a sprocket wheel not shown mounted upon the shaft of the device to be controlled. A pipe 10 leads from a port in the top of the casing midway between the centers of the piston wheels, to one end of the casing of my controller proper (to be presently further alluded to) while an oil cup 14 is connected to the uppermost point of this pipe, and a second pipe 12 leads from the underside of the casing, in the same vertical plane as the point with which the first mentioned pipe communicates, to the opposite end of the casing of my controller. This controller proper consists of a pair of angle chambers 15 and 16 coupled together by a valve casing 17 having a valve chamber 18 midway of its length and the opposite sides of said chamber being formed with valve seats 19 and 20. A valve spindle 21 is located movably in this valve casing and projects from one angle chamber through the casing to the other angle chamber and has the valve proper 22 carried rigidly thereon midway of its length and between the valve seats 19 and 20. The valve is localized relatively to the seats and the extent of its movement adjusted by a pair of adjustable bearings constituted by a pair of spindles 25 and 26 having their inner ends chambered as at 27 to receive the ends of the valve spindle, and their opposite ends provided with hand-wheels 28, while a portion of each near the inner end thereof is formed with a screw-thread 28 adapted to be screwed into the threaded interior of a pair of bearings 29 constituting one wall of the angle chambers and having stuffing boxes 30 upon their outer ends to prevent leakage around the spindle.

Upon the rotation of sprocket wheel 9 the piston-wheels 4 and 5 are rotated thereby causing the oil to travel through pipe 12, angle chamber 15, valve casing 17, angle chamber 16, and pipe 12 back to the brake chamber 2 through which it moves with the rotation of the piston wheels. By retarding the flow of the oil through this circuit the rotation of the piston-wheels and consequently the speed of travel of the device being controlled is correspondingly retarded and to effect this I screw the spindle 26 sufficiently far out of its end of the controller to allow the valve spindle and with it the valve to move under pressure of the oil flowing in the direction indicated by the arrow in the drawings to almost rest upon the seat 20, or assume a position in such adjacency to the said seat as to offer the required resistance; while the spindle 25 will be screwed into the controller to a position to prevent the valve moving past the center of the chamber 18 when the car is being raised under the influence of the counterpoise and the oil and piston wheels are moving in an opposite manner to that just described thereby allowing such oil perfect freedom to flow through the valve seat 19 in the direction opposite to that indicated in the drawings which will in turn allow the piston wheels to rotate freely and the device being controlled to travel quickly in the opposite direction.

This application is a divisional part of No. 192,157, filed Feb. 5, 1904.

What I claim is as follows:—

1. The combination with a chamber having an external pipe circuit leading from one side thereof to the opposite side and such chamber and pipe circuit being adapted to contain a liquid, a movable part located in such chamber and the movement whereof causes the liquid to flow through the latter and the duct in either direction according to the direction of movement of the said movable part, of a valve chamber included in the pipe circuit and having a valve seat, a valve in the chamber for controlling the flow of said liquid through the seat and while allowing the same to flow in either direction retard such flow in one direction to a greater degree than in the opposite direction.

2. The combination with a chamber having an external pipe circuit leading from one side thereof to the opposite side and such chamber and pipe circuit being adapted to contain a liquid, a movable part located in such chamber and the movement whereof causes the liquid to flow according to the direction of movement of the said movable part, of a valve chamber included in the pipe circuit and having a valve seat, a valve in the chamber for controlling the flow of said liquid through the seat, and a member within the chamber for limiting the movement of the valve towards its seat for the purpose of allowing the liquid to flow in either direction and retarding its flow through the seat to a greater degree than in the opposite direction.

3. The combination with a chamber having an external pipe circuit leading from one side thereof to the opposite side and such chamber and pipe circuit being adapted to contain a liquid, a movable part located in such chamber and the movement whereof causes the liquid to flow through the latter and the duct in either direction according to the direction of movement of the said movable part, of a valve chamber included in the pipe circuit, and having a pair of valve seats, a valve in the chamber between the said valve seats and adapted to be seated on either one for controlling the flow of said liquid through the seat and means within the chamber for limiting the movement of the valve towards either seat for the purpose of allowing the liquid to flow in either direction and retarding its flow through one seat to a greater degree than through the other.

4. The combination with a chamber having a movable part, angle chambers 15 and 16, valve casing 17 connected at its opposite ends to the angle chambers and having a valve chamber 18, a duct leading from one side of said first mentioned chamber to one of the angle chambers, a second duct leading from the opposite side of said first mentioned chamber to the other angle chamber, said chambers and ducts constituting a circuit adapted to contain a liquid and the movement of said movable part being adapted to cause the liquid to flow through said circuit, such valve chamber presenting a pair of seats, a valve located between said seats and adapted to be seated on either one thereof, a valve spindle projecting longitudinally through the valve chamber and having said valve mounted rigidly thereon, a pair of screw-threaded spindles screwed into the angle chambers in line with and adapted to receive and support the opposite ends of the valve spindle, means whereby the screw-threaded spindles are rotated, and means for supporting the valve spindle in line with said screw-threaded spindle said screw-threaded spindles being adapted to limit the movement of said valve spindle.

5. The combination with a chamber having a movable part, angle chambers 15 and 16, valve casing 17 connected at its opposite ends to the angle chambers and having a valve chamber 18, a duct leading from one side of said first mentioned chamber to one of the angle chambers, a second duct leading from the opposite side of said first mentioned chamber to the other angle chamber, said chambers and ducts constituting a circuit adapted to contain a liquid and the movement of said movable part being adapted to cause the liquid to flow through said circuit, such valve chamber presenting a pair of seats, a valve located between said seats and adapted to be seated on either one thereof, a valve spindle projecting longitudinally through the valve chamber and having said valve mounted rigidly thereon, a pair of screw-threaded spindles screwed into the angle chambers in line with and adapted to receive and support the opposite ends of the valve spindle, means whereby the screw-threaded spindles are rotated the adjacent ends of the said screw-threaded spindles being chambered and receiving and limiting the movement of said valve spindle.

In testimony whereof, I have signed my name to this specification, in the presence of two subscribing witnesses.

OVID MINER GOULD.

Witnesses:
WILLIAM P. McFEOT,
FRED J. SEARS.